Patented Sept. 15, 1925.

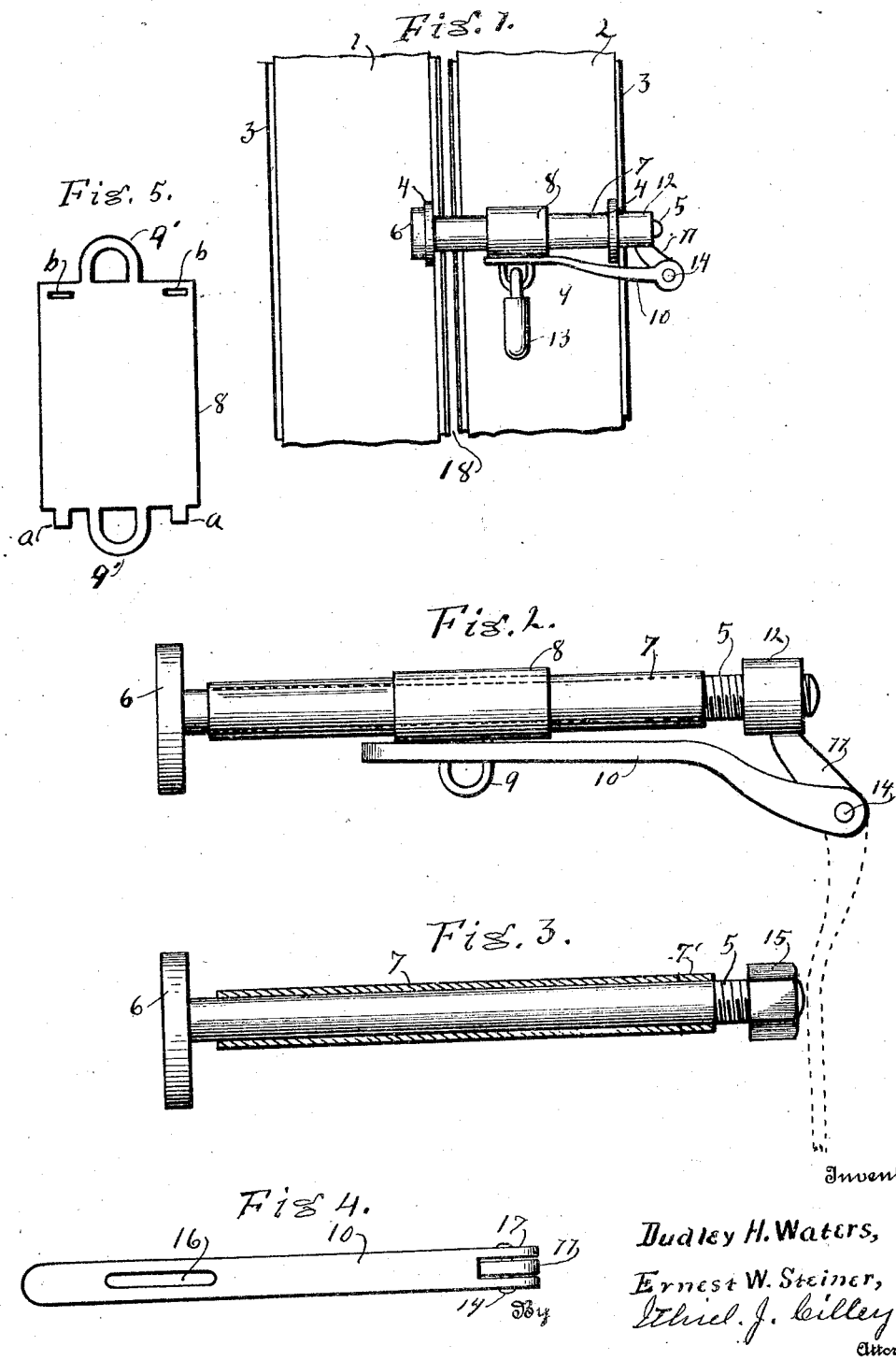

1,554,150

UNITED STATES PATENT OFFICE.

DUDLEY H. WATERS AND ERNEST W. STEINER, OF GRAND RAPIDS, MICHIGAN, ASSIGNORS TO HAYES IONIA SERVICE COMPANY, OF GRAND RAPIDS, MICHIGAN, A CORPORATION OF MICHIGAN.

EXTRA-TIRE CARRIER.

Application filed February 8, 1924. Serial No. 691,362.

*To all whom it may concern:*

Be it known that we, DUDLEY H. WATERS and ERNEST W. STEINER, citizens of the United States, residing at Grand Rapids, in the county of Kent and State of Michigan, have invented certain new and useful Improvements in Extra-Tire Carriers, of which the following is a specification.

Our invention relates to improvements in appliances for securing extra tires and tire rims upon automobiles, and its objects are: First, to provide a means whereby one or more extra tires may be secured to the one extra tire rim that is usually carried upon automobiles, and, second, to provide a means whereby the said extra tires and tire rims may be secured against any possible danger of the two tires being chafed against each other, and, also, against the danger of jarring loose, or of being removed by those not having authority to remove them.

We attain these objects by the mechanism and construction and distribution of parts shown in the accompanying drawing, in which Fig. 1 is an inside plan of two tires and tire rims with one form of our device in place. Fig. 2 is an enlarged plan of the same form of our device. Fig. 3 shows our securing bolt with an ordinary nut thereon and with a longitudinal section of the securing sleeve thereon, and Fig. 4 is a plan of the locking lever, and Fig. 5 is a plan of the blank from which the sleeve 8 is made.

Similar reference numerals indicate similar parts throughout the several views.

In Fig. 1, 1 represents a short piece of a tire rim that is designed to be secured to an ordinary extra tire carrier, and 2 represents a like rim secured to the rim that carries the first extra tire, shown at 3. Our device consists of a bolt 5 designed to pass through the holes in the lugs 4 on the rims 1 and 2. This bolt has an oblong head as shown at 6 designed to rest sidewise against the surface of the tire rim 1 in such a manner that the bolt cannot possibly turn around when the nut 12, or 15 is being screwed upon the bolt. The sleeve 7 is made to slide freely over the bolt 5, and is made of a proper length so that when placed between the two lugs 4, as in Fig. 1, the faces of the lugs will be pressed solidly against the ends of the sleeve and the tires 3 will be permanently spaced apart, as indicated at 18 in Fig. 1.

It is designed that two bolts shall be used for the securing of each extra tire, the one consisting of a plain bolt 5, having the oblong head 6, and the sleeve 7, and arranged to be secured in place by a plain nut or burr 15. The other bolt is designed to provide a means for locking the extra tires securely in place, and for this purpose the nut 12 has an arm extending from one side, as at 11, with a lever 10 pivotally connected therewith, as 14—17. This lever has a mortise 16 through it for the free passage of the staple 9, so that a lock 13 may be applied, as shown in Fig. 1, by means of which the lever is securely locked in place so as to avert the danger of the extra tire being wrongfully removed from the carrier.

The length of the sleeve 7 may be varied to meet the several different diameters of tires, either by making different lengths of sleeve, or by providing extensions, as indicated at 7' in Fig. 3.

As it is necessary to vary the position of the staple 9 we have secured the staple firmly to, or made it integral with a short sleeve 8 that is designed to slide or to turn freely upon the sleeve 7, so that no matter what sizes of tires are carried, or what length of sleeve 7—7' may be used the staple may be readily and conveniently located thereon to accommodate the length of the lever 10.

When the lock 13 has been removed from the staple 9, the lever 10 may be extended, as indicated by its dotted outlines in Fig. 2 and utilized as a lever or wrench with which to screw the nut 12 firmly upon the bolt 5 for holding the tire rims rigidly in place, when the sleeve 8 may be slid lengthwise of and around upon the sleeve 7 until the staple is brought into the necessary position to pass freely through the mortise 16 in the handle. The sleeve 8 may be formed from a blank, as shown in Fig. 5, in which 9', 9' brought together form the lock loop 9 in Figs. 1 and 2, and the spurs *a* passed through the holes *b* form locking elements to hold the sleeve securely in form.

Having thus fully described our invention, what we claim as new in the art, is;

1. In a device for securing extra tires and their rims upon an automobile tire carrier, a bolt adapted to be passed through the holes in the lugs on tire rims, an oblong head upon said bolt, a sleeve fitted to pass freely over the body of the bolt to govern the distance between the tire rims, a nut fitted to screw upon the end of said bolt and having an arm integral therewith and extending outwardly from one side thereof, a lever pivotally mounted upon the end of said arm and having a slot therethrough near its free end, and a staple adapted to be passed through said slot for securing the end of lever in place upon the sleeve.

2. In combination with the elements covered in claim 1, a short sleeve slidably and revolubly mounted upon the main sleeve and having the securing staple made integral therewith for holding the lever in place.

3. In combination with the elements covered in claim 1 means for varying the length of the sleeve to adjust the length thereof to accommodate different tire diameters.

4. In combination with the elements covered in claim 1, an adjustable sleeve mounted upon the main sleeve and the staple integral therewith arranged to engage the slot in the lever, and means for adjusting the main sleeve to tires of different diameters.

Signed at Grand Rapids, Michigan, January 2, 1923.

DUDLEY H. WATERS.
E. W. STEINER.